July 1, 1958
R. TURK
2,841,456
UNILATERALLY LOADED BEARING, IN PARTICULAR RAILWAY JOURNAL BEARING
Filed July 18, 1955
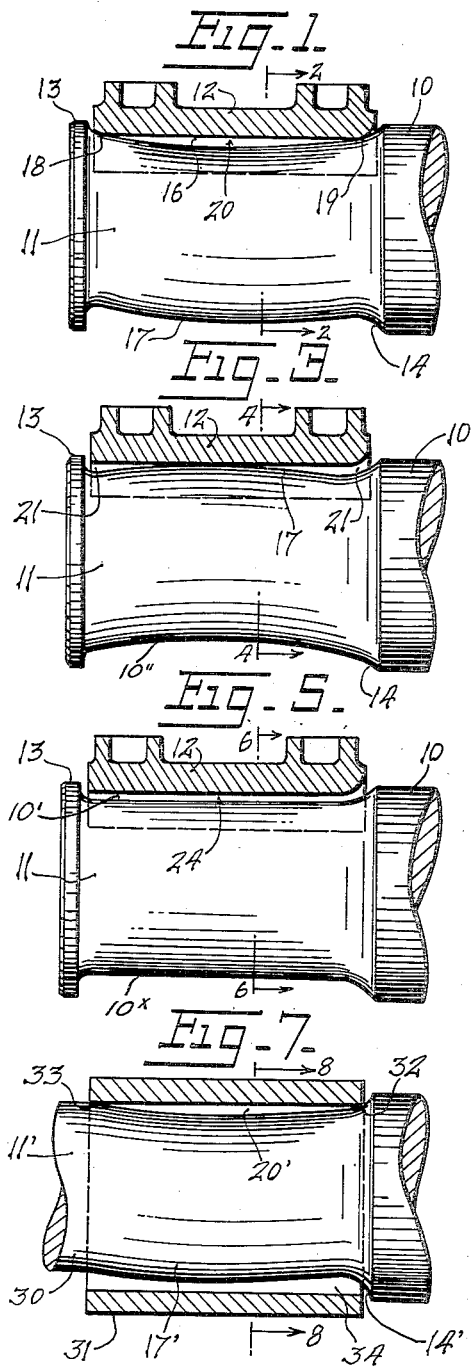
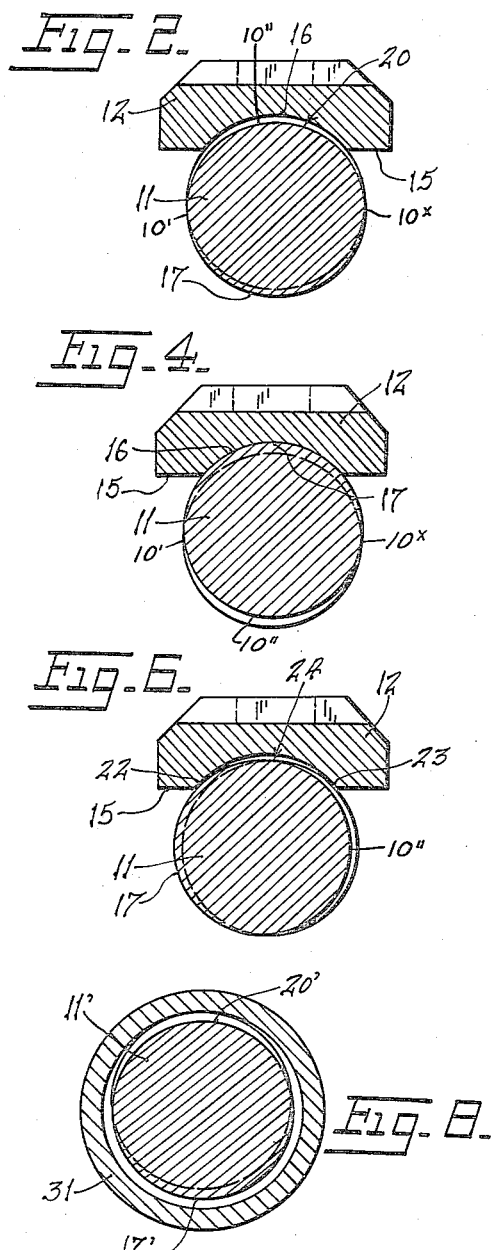
INVENTOR.
ROBERT TURK
BY
ATTORNEY

United States Patent Office 2,841,456
Patented July 1, 1958

2,841,456

UNILATERALLY LOADED BEARING, IN PARTICULAR RAILWAY JOURNAL BEARING

Robert Turk, Gars am Kamp, Austria

Application July 18, 1955, Serial No. 522,572

1 Claim. (Cl. 308—79)

This invention relates generally to journal bearings, and more particularly to a journal bearing such as a vehicle axle journal bearing of railway rolling stock and comprises a movable bearing bush and means for applying lubricating oil onto the rotating surface. The invention is an improvement over the invention shown in my Letters Patent Number 2,669,492 dated February 16, 1954, and Number 2,681,258 dated June 15, 1954.

Practice has shown that in spite of numerous designs the running time of these bearings is still insufficient and that a high percentage of them tends to run hot. All existing bearings are based on the idea of maintaining between the bearing surfaces a film of lubricant providing for minimum friction in operation. It has been found that in heavily loaded axle bearings of rolling stock, the bearing bushes, even where the bearing surface is machined most carefully, often do not stand even through a single inspection period and exhibit surface abrasion from one inspection to the next. This drawback is not due to defects in the material but to the fact that the bearing surface of the bearing bush rests on the journal under the loading pressure of the car always at nearly the same point, at the apex of the arc; for this reason, it is most heavily stressed frictionally by the rotating journal at this point.

By the constant pressure of the bearing bush on the rotating journal at the apex of the bearing surface of the bearing bush, excessive heat tends to be generated in spite of lubrication. Thereby the effect of the lubricant is partly reduced so that the bearing surface of the bearing bush is gradually abraded, beginning from the apex, in both circumferential directions. As the width of the abraded bearing surface of the bearing bush increases, it will offer a greater resistance to the passage of the lubricating film on the journal, and the abrasion of the bearing surface of the bearing bush will continue at a higher rate. In many cases, this abrasive process proceeds with such acceleration that a bearing exhibits hot-running tendencies within one inspection interval.

The principal object of the present invention is to eliminate this disadvantage by employing means that will first provide a permanently ample bearing surface relative to the arc of curvature of the journal, and secondly provide during the rotation of the journal alternate regions of space and contact thereby causing the bearing pressures to vary sharply in an axial direction.

In accordance with the present invention, the journal, generally formed with a straight cylindrical surface, is provided with one or more upward concavities or bends but preferably with a single curvature constituting a slight camber occupying in the axial direction at least part of the length of the journal and extending axially in both directions from a point midway the ends of the journal to points remote from said ends where it merges with the straight cylindrical surface of the journal.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view of a journal and bearing bush embodying one form of the invention, the journal being shown in one position of rotation.

Fig. 2 is a vertical sectional view taken on the plane of the line 2—2 of Fig. 1.

Fig. 3 is a view similar to Fig. 1 but showing the journal rotated 180° from the position of Fig. 1.

Fig. 4 is a vertical sectional view taken on the plane of the line 4—4 of Fig. 3.

Fig. 5 is a view similar to Fig. 1 but showing the journal rotated 90° from the position of Fig. 1.

Fig. 6 is a vertical sectional view taken on the plane of the line 6—6 of Fig. 5.

Fig. 7 is a view similar to Fig. 1 but showing a modified form of bearing.

Fig. 8 is a vertical sectional view taken on the plane of the line 8—8 of Fig. 7.

Referring particularly to Figs. 1 to 6, inclusive, of the drawings, showing the first form of the invention, a fragment of a railway rolling stock axle 10 is shown with an extended reduced portion 11 which forms the actual journal and is adapted to engage a bush bearing 12 in the journal box (not shown). The outer end of the journal, which is the end remote from the wheel, is conventionally provided with an annular flange 13, the journal proper lying between the circumferential shoulder 14 and said annular flange, thus in a measure limiting the possible end play or thrust of the journal in the box.

The bushing 12 is movably or floatingly mounted in the journal box and is in the form of a block having a bottom wall 15 having an arcuate and curved portion 16 to make a running fit on the journal.

The journal 11 is cylindrical in cross section but, in accordance with the invention, it is formed along its length with a portion offset from the axis thereof and constituting a camber 17. This camber is curved longitudinally of the journal and extends from a point midway the ends of the journal to points on either side of said midway point remote from the ends of the journal, at which end points it merges gracefully with the remaining straight cylindrical portion of the journal. In Fig. 1 the camber 17 is exaggerated for the sake of clearness. In practice, the camber is offset from the remainder of the journal very slightly, e. g. by tenths of a millimeter, the degree of deflection depending upon the length and thickness of the whole bearing.

By reason of this construction, the journal 11 during a complete revolution presents successively, the camber portion 17, a first straight cylindrical portion 10', a depressed portion 10'' and a second straight cylindrical portion $10^x$ to the bushing 12. As viewed in Fig. 1, the journal 11 has been rotated so that the apex of the arc of the camber 17 is 180° away from the apex of the arc of the bushing 12. When the journal is in this position, the camber 17 is opposed to the bushing 12 and the ends of the bushing bear against the cylindrical portions of the journal at points adjacent the flange 13 as indicated at 18 and adjacent the shoulder 14 as indicated at 19, leaving a chamber 20 between the bushing and journal which is closed at both ends, said chamber being so proportioned that it becomes shallower toward its ends. The chamber is very shallow, having a depth of hundredths of a millimeter.

As viewed in Fig. 3, the journal has been rotated to a position where the apex of the arc of the camber 17 contacts the apex of the arc of the bushing 12. In this position, the bushing is supported directly on the camber 17 leaving a recess 21 at either side of the point of contact between the journal and bushing, of a depth of hundredths of a millimeter.

As viewed in Fig. 5, the journal has been rotated so that the camber 17 is disposed horizontally 90° away from the apex of the arc of the bushing. Herein the bushing 12 seats at one point on the camber 17, at its center, as indicated at 22 and at another point on the journal as indicated at 23 in Fig. 6, leaving a space or clearance 24 between the surfaces of the journal and bushing extending the length of the bushing and being open at both ends. The depth of the clearance 24 measures hundredths of a millimeter.

In operation, as the journal 11 rotates, it is provided over its surface with lubricating oil by any known means such as a lubricating pad or the like (not shown) so that this surface is provided with a film of lubricant. When the journal is rotated to the position of Fig. 1, the chamber 20 is formed between the surfaces of the bushing and journal. This chamber permits the lubricant to ooze towards the center of the bushing surface. Upon continued rotation, the chamber begins to close, the pressure of the journal displacing and forcing the lubricant transversely and longitudinally over the journal, leaving a thin film of lubricant interposed between the opposed contacting surfaces.

When the journal is rotated to the position of Fig. 5, the clearance 24 is formed. In this position of the journal, the lubricant is distributed along the entire surface of the bushing 12.

Upon continued turning, the journal reaches the position of Fig. 3 in which position the bearing surfaces of both the journal and bushing contact only at the midsection of the camber 17 leaving the shallow clearance 21 on either side of the midsection, in each of which clearances a so-called lubricating wedge is formed.

In the modification of the invention shown in Figs. 7 and 8, the journal 11' is elongated having a camber 17' formed therealong and continuing into an elongated cylindrical portion 30. The bushing is in the form of a sleeve 31 which seats on the journal at a point, adjacent its shoulder 14', as indicated at 32, and at a point adjacent the beginning of the cylindrical portion 30 as indicated at 33. In this construction, the diameter of the sleeve 31 is such that a shallow chamber 20' is formed at the top as viewed in Fig. 7 between the sleeve 31 and the journal 11', said chamber being closed at both ends permitting the lubricant to ooze toward the center of the bushing. A clearance 34 is also provided below the journal between the said journal and the bushing whereby the bushing is lubricated for its entire length.

The flexure of the journal may be so slight that no appreciable gap or chamber need be formed between the bearing surfaces of the journal and bushing as the bushing and the journal normally deflect somewhat in the region of the bearing surfaces during the sliding action which takes place therebetween. However, in consequence of the necessarily resulting oversize of the bushing diameter relative to the radius of the curvature of the bearing surface, and in consequence of the fact that even without actual gaping, the bearing pressure at every axle revolution will vary sharply in axial direction from the extremes to the center and vice versa, an efficient lubrication will be provided even in the case of very wide bush bearing surfaces.

Railway journal boxes may be mounted on the improved cambered journals as heretofore, making the usual oversize allowances.

Journals embodying the invention may be machined to the required shape by means of ordinary machine tools. Alternately, however, particularly in the case of railway journals, shaping can be effected by supporting a standard axle journal at its collar and seat, and bending the bearing surface at its center by means of a press. By means of a die placed on top, excessive deflection of the axle can be avoided. The same may be avoided by fixing the seat in a strong fixture that will itself be distorted. As this deflection amounts to merely slight deviations from a straight journal, it will not interfere with any subsequent refinishing of the journal that may become necessary for any reason.

The point of support of the improved bearing varies continuously in an axial direction during each revolution of the axle, from the two ends of the bushing to the middle and from the middle of the bushing to the two ends thereof.

Journals may be made in accordance with the invention wherein the journal is repeatedly deflected very slightly, leaving perfectly straight journal portions between the points of flexure.

By twice rapidly heating unilaterally to a particular temperature, a standard journal may be caused to deflect in the required manner without other application of energy.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

An axle bearing comprising a bearing bushing having a straight bottom wall with an arcuate-shaped portion and a journal engaging the arcuate-shaped portion of said bushing, said journal having a shoulder at one end and a flange at the other end thereof, the circumference of said journal including a cambered portion extending axially from a point midway the shoulder and flange to a point on either side of said midway point remote from the shoulder and flange and extending circumferentially substantially one hundred and thirty-five degrees therearound, a first straight cylindrical portion alongside said cambered portion extending axially from a point remote from the shoulder to a point remote from the flange and extending circumferentially substantially forty-five degrees therearound, a depressed portion alongside said first straight cylindrical portion extending axially and circumferentially coextensively with the cambered portion, and a second straight cylindrical portion alongside said depressed portion extending axially and circumferentially coextensively with the first straight cylindrical portion.

References Cited in the file of this patent

UNITED STATES PATENTS

| | | |
|---|---|---|
| 1,906,715 | Penick | May 2, 1933 |
| 2,172,219 | Newberry | Sept. 5, 1939 |
| 2,344,275 | Straub | Mar. 14, 1944 |
| 2,669,492 | Turk | Feb. 16, 1954 |

FOREIGN PATENTS

| | | |
|---|---|---|
| 380,660 | Great Britain | Sept. 22, 1933 |
| 800,515 | Germany | Nov. 13, 1950 |